Figure 1:
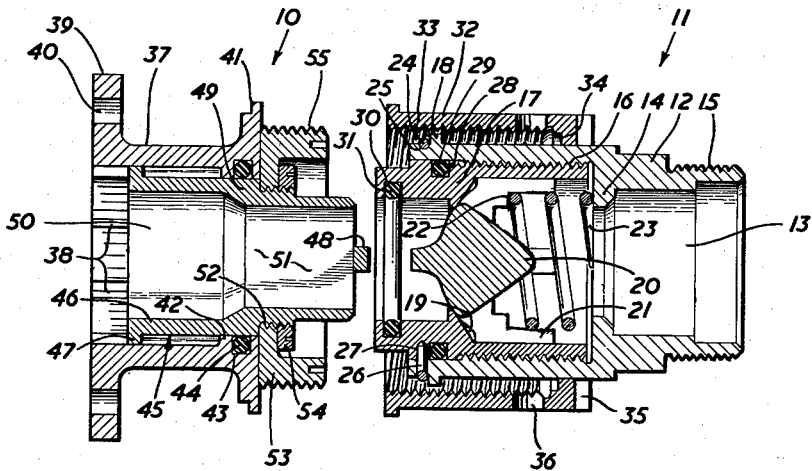

Jan. 17, 1961    L. M. TRELEMAN    2,968,497
SELF-SEALING COUPLING
Filed Feb. 5, 1958

INVENTOR
L. M. TRELEMAN 2,968,497
Patented Jan. 17, 1961

2,968,497
SELF-SEALING COUPLING

Lionel Mervyn Treleman, Toronto, Ontario, Canada, assignor to Avro Aircraft Limited, Malton, Ontario, Canada, a corporation of Canada Filed Feb. 5, 1958, Ser. No. 713,407

1 Claim. (Cl. 284—19)

This invention relates to couplings for fluid conduits.

The object of this invention is to provide an improved coupling that has standing parts which require no relative movement upon connection or disconnection and that is self sealing.

Figure 2:
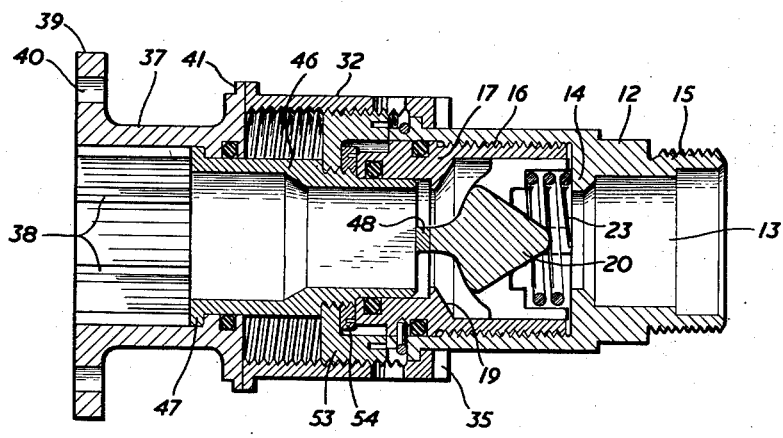

Further objects of this invention will be apparent to those skilled in the art from the following description when read in conjunction with the accompanying drawings which show a preferred embodiment of the invention and in which like reference characters refer to like parts. In the drawings:

Fig. 1 is a sectional side view of the coupling in a disconnected relationship; and Fig. 2 is a sectional side view of the coupling of Fig. 1 in a connected relationship.

The drawings show a coupling consisting of a male part generally shown at 10 and a female part generally shown at 11.

The female part 11 consists of a tubular valve housing 12 that has a longitudinal bore 13 extending through it and an internal annular flange 14. The valve housing 12 has one end that is externally threaded at 15 to receive a standard rigid pipe union or the like (not shown) and another end that is internally threaded at 16 to receive a generally cylindrical hollow insert portion 17 of the housing. The latter end of the housing also has an external annular flange 18.

The insert portion 17 is provided with a surface forming a conical valve seat 19 for an "acorn" valve 20 having four guide arms 21 located at equi-angular intervals about the axis of the housing. Each of the guide arms 21 has a step 22 against which one end of a biasing coil spring 23 bears. The other end of the coil spring 23, which urges the valve 20 towards the valve seat 19 to hold the valve closed, bears against annular flange 14 of the valve housing 12.

The insert 17 is part of the valve housing and is locked thereto in a fixed relationship by an internal circlip 24 that is located in a groove 25 in valve housing 12 and that has prongs projecting inwardly through holes 26 and 27 in the valve housing 12 and the insert portion 17 respectively. The insert portion 17 has a groove 28 for an "O-ring" 29 which acts as a seal between the valve housing 12 and the insert portion 17 and a second groove 30 for a second "O-ring" 31.

A female part coupling element 32 which is internally threaded at 33 surrounds the valve housing 12 and has an internal annular flange 34 which is rotatable and slidable on the external surface of the valve housing 12 and which can cooperate with the flange 18 on the valve housing 12 to limit axial movement of the female part coupling element. One end of the coupling element 32 has castellations 35 that can receive a wrench or some like tool. The coupling element 32 is provided with six holes 36 for inspection purposes.

The male part consists of a tubular body 37 that is coaxial with the valve housing 12 but occupies a position in which it is spaced apart axially from the housing.

The body 37 has six internal splines 38 extending in an axial direction, the internal splines 38 being disposed equi-angularly about the axis of the body 37. The body 37 has one end that has an annular external mounting flange 39 having mounting holes 40 and another end that has an annular external flange or abutment 41 and a continuous internal annular land 42 defining one end of the internal splines 38, the land 42 having an annular groove 43 for an "O-ring" 44.

A tubular valve actuator 45 consisting of a stub pipe 46, having six stub splines 47 disposed at equi-angular intervals about its axis, is slidable in the body 37 coaxially thereof towards and away from the housing 12 with the stub splines 47 received in the internal splines 38 to prevent rotation of the actuator 45 relatively to the body 37. A cross bar 48 bridges one end of the stub pipe 46 and is adapted to engage the valve 20.

A shoulder 49 in the stub pipe 46 defines a large diameter portion 50 and a small diameter portion 51 that is externally threaded at 52 to receive a coupling portion 53 of the actuator. A lock ring 54 holds the portion 53 in a fixed relationship to the stub pipe 46.

The coupling portion 53 is of generally cylindrical shape and has its external surface 55 threaded so as to be securable to the threaded female part coupling element.

For connection of the male part 10 to the female 11, the female part coupling element 32 is slid along the external surface of the valve housing 12 towards the tubular body 37 and is screwed onto the threaded external surface 55 of the actuator's coupling portion 53. It is desirable that the threads at 33 and 55 be multi-start coarse pitch threads so that only a few turns of the female part coupling element 32 are required. When axial movement of the female part coupling element 32 is limited by the abutting of the end of the element 32 against the abutment 41, and by the abutting of the flange 34 against the external flange 18 of the valve housing 12, the actuator 45 is drawn and extends into the valve housing 12, with the "O-ring" 31 providing a seal between them, and the cross bar 48 on one end of the stub shaft 46 engages the valve 20 and moves it off the valve seat 19. Thus it can be seen that connection of the coupling does not require an axial movement of the tubular body 37, which forms a standing part, and the valve housing 12, which forms another standing part. The connecting means of the coupling, consisting of the threaded element 32, the threaded portion 53, and the telescoping portions 51 and 31, provide a fluid tight seal between the tubular actuator 45 and the housing 12, and since the telescoping portions 50 and 43 provide a fluid tight seal between the tubular actuator and the body 37 a fluid tight connection is thus made through the tubular actuator from the tubular body to the tubular housing without changing the relative positions of the body and housing. It may also be seen that the fluid can flow only when the connecting means are engaged sufficiently for the cross bar 48 to engage the valve 20, the valve being moved off the valve seat 19 as the connecting means fully engage.

What I claim in my invention is:

A coupling for a fluid flow system comprising a tubular valve housing, a valve in the housing, means for holding the valve normally closed, a tubular body coaxial with the tubular housing and axially spaced therefrom, a tubular actuator coaxial with the tubular body and slidable therein so as to be extensible from the tubular body towards the housing while retaining a fluid tight seal with the tubular body, means to prevent relative rotation between the actuator and the body, co-operating sealing means engageable together to provide a fluid tight seal between the tubular actuator and the tubular housing when the actuator is extended from the tubular body, whereby a fluid tight connection is made through the tubular actuator from the tubular body to the tubular housing without the necessity of relative axial movement of the tubular body and housing, means on the actuator for forcing the valve to open as the actuator becomes fully extended from the tubular body, theraded connecting means for extending the tubular actuator from the tubular body and for making a releasable connection between the tubular body and the housing, the threaded connecting means comprising an actuator coupling portion having an external thread and secured to the tubular actuator and an internally threaded coupling element surrounding the tubular housing, the coupling element being both rotatable and axially movable relative to the housing to extend beyond the housing towards the body, cooperating external and internal flanges on the body and the coupling element respectively engageable to limit movement of the coupling element towards the body so that appropriate rotation of the coupling element subsequent to engagement of said flanges draws the actuator towards the housing, and engageable abutments on the actuator and the housing to limit the movement of the actuator towards the housing.

References Cited in the file of this patent

UNITED STATES PATENTS

| | | |
|---|---|---|
| 1,318,674 | Knoll | Oct. 14, 1919 |
| 2,218,318 | Pfauser | Oct. 15, 1940 |
| 2,254,997 | Fisher | Sept. 2, 1941 |
| 2,441,363 | Krueger | May 11, 1948 |
| 2,449,938 | Hansen | Sept. 21, 1948 |
| 2,480,866 | Lusk | Sept. 6, 1949 |